(12) United States Patent
Trubody

(10) Patent No.: US 8,172,249 B2
(45) Date of Patent: May 8, 2012

(54) TOW BAR PROTECTION DEVICE

(75) Inventor: Paul Albert Trubody, Victoria Point (AU)

(73) Assignee: Towbar Safety Sock Pty Ltd., Thornland, Queensland (AU)

( * ) Notice: Subject to any disclaimer, the term of this patent is extended or adjusted under 35 U.S.C. 154(b) by 1336 days.

(21) Appl. No.: 11/665,785

(22) PCT Filed: Oct. 21, 2005

(86) PCT No.: PCT/AU2005/001640
§ 371 (c)(1),
(2), (4) Date: Apr. 19, 2007

(87) PCT Pub. No.: WO2006/042376
PCT Pub. Date: Apr. 27, 2006

(65) Prior Publication Data
US 2009/0058045 A1    Mar. 5, 2009

(30) Foreign Application Priority Data

Oct. 21, 2004 (AU) ............................... 2004100902
Nov. 3, 2004 (AU) ............................... 2004906316

(51) Int. Cl.
*B60D 1/60* (2006.01)
(52) U.S. Cl. ..................................................... 280/507
(58) Field of Classification Search .................. 280/507
See application file for complete search history.

(56) References Cited

U.S. PATENT DOCUMENTS

| | | | |
|---|---|---|---|
| 2,616,717 A * | 11/1952 | Dunlap | 280/507 |
| 2,671,675 A | 3/1954 | Swaisgood | |
| 4,509,770 A * | 4/1985 | Young et al. | 280/507 |
| 4,955,968 A | 9/1990 | Beckerer, Jr. | |
| D316,069 S | 4/1991 | Yocum | |
| D317,745 S | 6/1991 | Beckerer, Jr. | |
| 5,037,122 A | 8/1991 | Beckerer, Jr. | |
| 5,421,601 A | 6/1995 | Hinze et al. | |
| 6,039,339 A | 3/2000 | Bello | |
| 6,322,094 B1 | 11/2001 | Poe | |
| 6,412,806 B1 | 7/2002 | Peacock | |
| 6,832,775 B1 | 12/2004 | Muller | |
| 6,857,652 B2 | 2/2005 | Dougherty | |
| 6,938,912 B1 * | 9/2005 | Norton et al. | 280/507 |
| 7,014,205 B1 * | 3/2006 | Reilly | 280/507 |
| 7,677,589 B2 * | 3/2010 | Prine | 280/507 |
| 2004/0130125 A1 | 7/2004 | Dougherty | |
| 2006/0017261 A1 * | 1/2006 | Rickey | 280/507 |
| 2007/0235983 A1 * | 10/2007 | Braun | 280/507 |
| 2010/0025965 A1 * | 2/2010 | Caldwell | 280/507 |

FOREIGN PATENT DOCUMENTS

DE          29821005          5/1999

* cited by examiner

*Primary Examiner* — Kevin Hurley
(74) *Attorney, Agent, or Firm* — Stein McEwen, LLP

(57) ABSTRACT

A tow bar protection device for a tow bar assembly having a hitch bar portion with a ball mount and mounting a bail, the hitch bar portion extending rearwardly from the vehicle to which the assembly is attached, the protection device including a resilient pouch having an opening for receiving and covering at least a part of the rearwardly extending portion of the tow bar assembly.

7 Claims, 1 Drawing Sheet

TOW BAR PROTECTION DEVICE

FIELD OF THE INVENTION

The present invention relates to towbar protection devices and in particular to devices for at least partially covering a tow bar assembly to minimize damage thereto or caused by the tow bar assembly.

BACKGROUND ART

Vehicle tow bar and tow ball protection devices are known. A very good discussion of the prior art devices is given in U.S. Pat. No. 6,412,806 and is reproduced below:

"Protective coverings for trailer hitches have been known for quite some time. U.S. Pat. No. 2,671,675 to Swaisgood (1950) discloses such a device. The Swaisgood device is particularly adapted to the type of hitches found in its era—which were typically mounted right next to the vehicle bumper. It does provide protection against accidental contact with the grease and grime on the hitch ball. It also creates an attractive appearance for the covered hitch. However, the Swaisgood device is quite cumbersome to remove and install. It requires the use of a wrench on an exposed bolt head. Additionally, because it is a hard-surfaced device, it does not prevent injury to persons accidentally walking into the hitch.

A device more adapted to modern hitch construction is disclosed in U.S. Pat. No. 4,955,968 to Beckerer, Jr. (1990). The Beckerer, Jr., device is formed as a single piece of molded plastic or rubber. In the case of the plastic version, it has a stand-off distance from the metal of the hitch, thereby providing some cushion for things striking the hitch. The molded rubber version, being apparently made of closed-cell foam (see FIG. 11 of '968 disclosure) appears to provide even more injury protection. The Beckerer, Jr., device appears to adequately protect the area of the hitch ball itself. However, modern hitch assemblies have extendable draw bars which may protrude 18 inches or more beyond the vehicle's bumper. The '968 device provides no protection for all that additional metal, which can certainly cause injury as well.

U.S. Pat. No. Des. 316,069 to Yocum (1991) discloses an ornamental design similar to the '968 disclosure. Like the '968 disclosure, it only covers the area immediately surrounding the hitch ball. A similar configuration is disclosed in U.S. Pat. No. Des. 317,745 to Beckerer, Jr. (1991).

U.S. Pat. No. 5,037,122 (1991) to Beckerer, Jr., discloses a refinement of the '968 device. The '122 disclosure provides an improved version of the closed-cell foam rubber protector. It also discloses improved techniques for engaging the device with the hitch assembly. However, the reader will also note that the '122 device is still limited to the area immediately surrounding the hitch ball. Those skilled in the art will also realize that many of the variations disclosed would be difficult to install and remove.

A modern extended draw bar type hitch is disclosed in U.S. Pat. No. 5,421,601 to Hinze et. al. (1995). FIG. 1 of the Hinze et. al. nicely illustrates the shortcoming of a guard which only covers the area immediately adjacent to the hitch ball. A great deal of potentially dangerous metal is left exposed. The Hinze et. al. device addresses this concern with a large, bifurcated box. The box is hollow and split into two halves. Each half can be slipped around the bulky hitch assembly, and then locked together using the clips shown. Because the box is rigid, it must be greatly oversized to accommodate the many variations in hitch assemblies. Those skilled in the art will realize that the hitch assembly illustrated can be adjusted substantially in several directions. This fact causes problems for the approach taken in Hinze et. al.

The known devices for protecting a trailer hitch assembly are therefore limited in that they:
1. Require tools to install and remove;
2. Are difficult to install and remove;
3. Only protect the area immediately surrounding the hitch ball;
4. Are too bulky; and
5. Are not sufficiently flexible to accommodate variations in hitches."

These problems remain even with the solution proposed in U.S. Pat. No. 6,412,806.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to a tow bar protection device, which may at least partially overcome at least one of the abovementioned disadvantages or provide the consumer with a useful or commercial choice.

In its simplest form, the invention resides in a tow bar protection device for a tow bar assembly having a hitch bar portion with a ball mount and mounting a ball, the hitch bar portion extending rearwardly from the vehicle to which the assembly is attached, the protection device including a pouch having an opening for receiving and covering at least a part of the rearwardly extending portion of the tow bar assembly.

In an alternative form, the invention resides in a tow bar protection device for a tow bar assembly having a hitch bar portion with a ball mount and mounting a ball, the hitch bar portion extending rearwardly from the vehicle to which the assembly is attached, the protection device including a pouch having an opening for receiving and covering at least a part of the rearwardly extending portion of the tow bar assembly, at least one loop opening located adjacent the opening of the pouch; and a cinching strap adapted to draw the opening tight about the rearwardly extending hitch bar portion of the tow bar assembly and thereby cinch said pouch relative to the tow bar assembly.

The device of the present invention is designed to be used with tow bar assemblies. Most conventional tow bar assemblies have the same basic features. One common and popular arrangement that accomplishes these ends is the so-called "ball and socket" arrangement that provides a spherical ball carried by a depending bolt for fastening on a rigid hitch bar that extends rearwardly of a first vehicle to perform the towing function. The ball co-operates with a hitch structure, having a hemispherical chamber to pivotally receive the ball, carried by a rigid hitch bar structurally connected to the towed vehicle. The hitch structure commonly provides a fastening arm that communicates with the associated ball at some portion of the hemispherical surface thereof that is not covered by the hemispherical chamber of the hitch to prevent the hitch from becoming accidentally disengaged from the ball.

The device of the present invention is designed to be used mainly with the part of the towing assembly attached to the towing vehicle but it can also be used to protect the hitch structure of the towed vehicle.

The device includes a pouch having an opening for receiving and covering at least a part of the rearwardly extending hitch bar portion of the tow bar assembly. The pouch may alternatively be designated as a compartment, and is generally sock-like in configuration.

The pouch will typically be manufactured of a flexible and resilient material. It will also typically be a multipart item, manufactured from more than one part attached together.

According to a particularly preferred embodiment, the pouch includes a pair of substantially planar, generally rectangular sheets of flexible, resilient material joined to one another about three of their edges to form a pocket, with closed sides and distal end, and an open proximal end.

Typically, the fourth edges of each respective sheet are not joined thereby leaving an opening, which in use, is positioned about proximal end portion of hitch bar. The material used for the pouch is a polymeric foam material or energy absorbing material. A particularly preferred material of construction is a neoprene rubber or similar. The sheets of neoprene rubber will typically have a thickness of between 5 and 20 mm, but other thicknesses could be used depending upon application.

The pouch of the invention also has at least one loop opening located adjacent the opening of the pouch. According to a first preferred embodiment, the at least one opening may be in a pouch wall. There will generally be at least two openings in the pouch wall, one opening suitably located on either side of the pouch.

According to a second preferred embodiment, the at least one opening may be a loop of material attached to the pouch adjacent the opening to the pouch. There will generally be at least two loop openings, one loop opening suitably located on either side of the pouch.

The loop openings will typically be attached to an inner surface of the pouch and extend outside the pouch. When the pouch is not attached to the tow bar assembly, the loop openings may be tucked inside the pouch.

The loops will typically be flexible but of a substantially inextensible material as stretching of the loop material when the pouch is attached to the tow bar assembly may lead to loosening of the pouch and exposure of the tow bar assembly.

The device of the invention preferably further includes a cinching strap adapted to draw the opening of the pouch tight about the hitch bar portion of the tow bar assembly and thereby cinch said pouch relative to the tow bar assembly.

The cinching strap is typically removably located through at least one loop opening. When the pouch is not in use, the cinching strap may be placed in the pouch so as not to be lost. Alternatively, the cinching strap may be secured relative to one side of the pouch and have a free end. Velro® or similar may be provided along the cinching strap. A loop may be provided on an opposed side of the pouch, and the free end of the cinching strap may be fed through the loop and then secured using the Velcro.

The cinching strap is preferably one or more planar strip portions. Even more specifically, it may be one or more lengths of material having securing means associated with the strap.

The cinching strap is adapted to be removably secured about the pouch when in use. Attachment means may be provided to attach one end of the cinch strap relative to the other end and to tighten the strap.

The cinch strap may preferably be provided with hook and eye attachment means such as Velcro®. Other types of securement means can be used such as tying the ends of the strap together. Still further, the cinch strap may be or include wire, elastic strapping or cord. One or more attachment pins may be also be provided on either the tow bar assembly or the pouch.

There may suitably be an additional ball-locating opening in one of the planar surfaces of the pouch. The ball-locating opening sits at least partially over the ball of the tow bar assembly to maintain the pouch in position. The ball-locating opening is sized to be located on the ball but not to allow the ball through the ball-locating opening unless force is applied to stretch the resilient material of the pouch to enlarge the opening. The pouch can remain in position over the hitch bar and the ball may be removed through the ball-locating opening in the pouch. Alternatively, the ball of the tow hitch may be received through the ball-locating opening allowing the pouch to closely receive the tow bar and the ball to protrude from the ball-locating opening.

The pouch may additionally include on or more reflective strips at the distal end of the pouch to aid visibility of the pouch and tow bar assembly. The pouch may also be marked using advertising material, trademarks, or coloured materials may be used in construction of the pouch.

In use, the opening of the pouch is placed over the hitch bar and moved towards the proximal end portion of the hitch bar until the closed distal end of the pouch abuts the distal end of the hitch bar and the ball is located relative to the opening in the wall of the pouch.

Where provided, the loop openings on respective sides of the pouch may then be folded back towards the distal end of the pouch so that they are arranged alongside the pouch. The cinch strap may then be fed through the loop openings, pulled tight and one end of the cinch strap secured relative to the other end of the cinch strap, thereby retaining the device in place.

In a second form, the invention resides in a tow bar protection device for a tow bar assembly having a hitch bar portion with a ball mount and mounting a ball, the hitch bar portion extending rearwardly from the vehicle to which the assembly is attached, the protection device including a pouch having an opening for receiving and covering at least a part of the rearwardly extending portion of the tow bar assembly, and closure means adapted to draw the opening tight about the rearwardly extending hitch bar portion of the tow bar assembly and thereby secure said pouch relative to the tow bar assembly.

The closure means may be adhesive, press-studs, buttons and openings, zippers or magnetic closure means.

Alternatively, the pouch may have more than one opening, which is not necessarily located at the proximal end of the pouch. The opening may extend substantially around the perimeter of the pouch and there may be various attachment points attaching the two portions of the pouch to each other.

BRIEF DESCRIPTION OF THE DRAWINGS

Various embodiments of the invention will be described with reference to the following drawings, in which.

DETAILED DESCRIPTION OF THE PREFERRED EMBODIMENT

According to a particularly preferred embodiment of the invention, a tow bar protection device 10 is provided.

Figure 1:
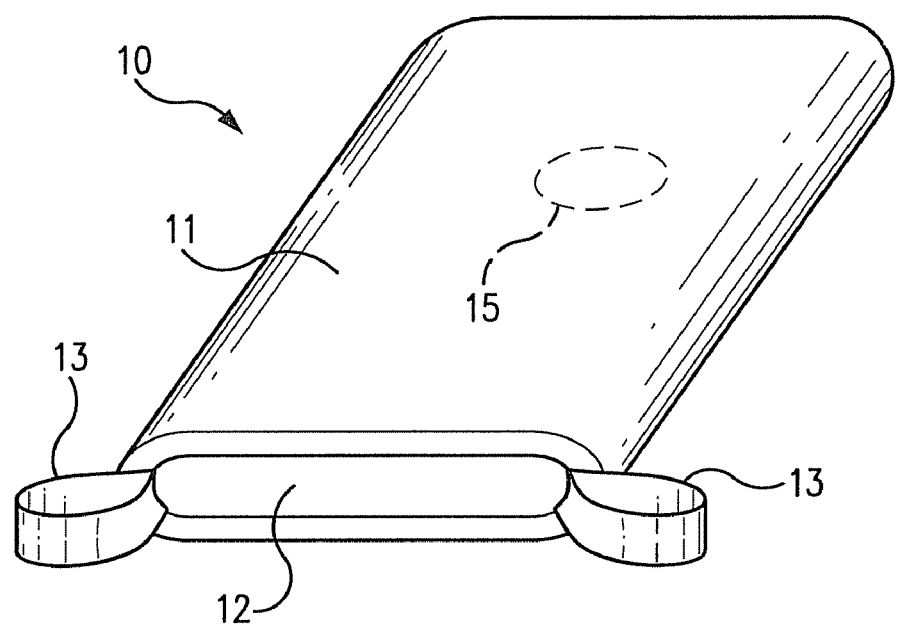
FIG. 1 is a schematic perspective illustration of a tow bar protection device according to a preferred embodiment of the present invention.
Figure 2:
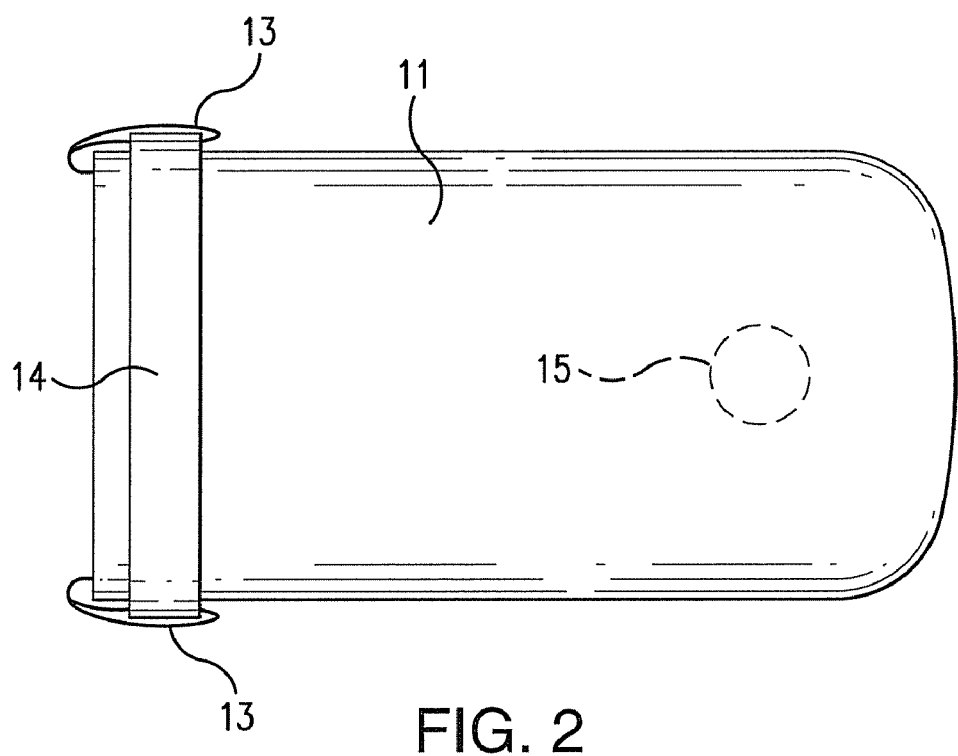
FIG. 2 is a top view of the tow bar protection device of FIG. 1.

The tow bar protection device 10 as illustrated in FIGS. 1 and 2 is a pouch 11 having an opening 12 for receiving and covering the rearwardly extending portion of a tow bar assembly (not shown). The device includes a pair of loop openings 13 located adjacent the opening of the pouch 11. It also includes a cinching strap 14 adapted to draw the opening 13 tight about the rearwardly extending hitch bar portion of the tow bar assembly and thereby cinch the pouch 11 relative to the tow bar assembly.

According to the preferred embodiment illustrated, the pouch 11 is manufactured from a pair of substantially planar, generally rectangular sheets of flexible, resilient material joined to one another about three of their edges to form the pouch 11, with closed sides and distal end, and an open proximal end.

The fourth edges of each respective sheet are not joined thereby leaving the opening 12, which in use, is positioned about proximal end portion of hitch bar. The material used for the pouch 11 is a polymeric foam material usually a neoprene rubber or similar. The sheets of neoprene rubber are approximately 8 mm thick, but other thicknesses could be used depending upon application.

The loop openings 13 are attached to the pouch 11 adjacent the opening 12 to the pouch 11. There are two loop openings 13, one loop opening 13 located on either side of the pouch 11.

The loop openings 13 are attached to an inner surface of the pouch 11 and extend outside the pouch 11. When the pouch 11 is not attached to the tow bar assembly, the loop openings 13 can be tucked inside the pouch 11.

The loop openings 13 are flexible but inextensible as stretching of the loop material when the pouch 11 is attached to the tow bar assembly can lead to loosening of the pouch 11 and exposure of the tow bar assembly.

The cinching strap 14 is removably located through the loop openings 13. When the pouch 11 is not in use, the cinching strap 14 is also placed in the pouch 11 so as not to be lost.

The cinching strap 14 is a planar strip portion provided with hook and eye attachment means such as Velcro®.

There is a ball-locating opening 15 in one of the planar surfaces of the pouch 11. The ball-locating opening 15 sits partially over the ball of the tow bar assembly to maintain the pouch 11 in position. The ball-locating opening 15 is sized to be located on the ball but not to allow the ball through the ball-locating opening 15 unless force is applied to stretch the resilient material of the pouch 11 to enlarge the ball-locating opening 15. The ball-locating opening 15 allows the pouch 11 to remain in position over the hitch bar and the ball to be removed through the ball-locating opening 15 in the pouch 11.

In use, the opening 12 of the pouch 11 is placed over the hitch bar and moved towards the proximal end portion of the hitch bar until the closed distal end of the pouch 11 abuts the distal end of the hitch bar and the ball is located relative to the ball-locating opening 15 in the wall of the pouch 11. The loop openings 13 on respective sides of the pouch 11 are folded back towards the distal end of the pouch 11 so that they are arranged alongside the pouch 11. The cinch strap 14 is fed through the loop openings 13, pulled tight and one end of the cinch strap 14 secured relative to the other end of the cinch strap 14, thereby retaining the device 10 in place.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The invention claimed is:

1. A tow bar protection device for a tow bar assembly having a hitch bar portion with a ball mount and mounting a ball, the hitch bar portion extending rearwardly from the vehicle to which the assembly is attached, the protection device including a pouch having an opening for receiving and covering at least a part of the rearwardly extending portion of the tow bar assembly, at least one loop opening located adjacent the opening of the pouch; and a cinching strap adapted to draw the opening tight about the rearwardly extending hitch bar portion of the tow bar assembly and thereby cinch said pouch relative to the tow bar assembly wherein the cinching strap is secured relative to one side of the pouch and has a free end, attachment means is provided on the cinching strap and a loop is provided on an opposed side of the pouch, and the free end of the cinching strap is fed through the loop and then secured using the attachment means.

2. A tow bar protection device according to claim 1 wherein the cinching strap is removably engageable with the at least one loop opening.

3. A tow bar protection device according to claim 1 wherein the pouch further includes a ball-locating opening, sized to be located on the ball of the tow bar assembly but not to allow the ball through the ball-locating opening unless force is applied to stretch the resilient material of the pouch to enlarge the ball-locating opening.

4. A tow bar protection device according to claim 1 including at least two loop openings, one loop opening located on either side of the pouch.

5. A tow bar protection device according to claim 1 wherein the pouch is manufactured of a polymeric foam material or energy absorbing material.

6. A tow bar protection device according to claim 1 wherein the pouch further includes a ball-locating opening, sized to allow the ball to be forced through the ball-locating opening.

7. A tow bar protection device according to claim 1 wherein the closure means is chosen from the group including adhesive, press-studs, buttons and openings, zippers and magnetic closure means.

* * * * *